United States Patent [19]

Gibson et al.

[11] Patent Number: 4,726,447
[45] Date of Patent: Feb. 23, 1988

[54] TREE CLIMBING SUPPORT

[76] Inventors: Steven P. Gibson, P.O. Box 452; Charles R. Dunham, Rt. 3, Box 181A; Scott E. Gibson, Rt. 1, Box 208B; Rockford E. Gibson, 501 Baltimore, all of Delhi, La. 71232

[21] Appl. No.: 936,623

[22] Filed: Dec. 1, 1986

[51] Int. Cl.[4] ............... A47C 9/10; A01M 31/02
[52] U.S. Cl. .................. 182/135; 182/187; 108/152
[58] Field of Search ............ 182/187, 133–136, 182/20, 188; 108/152

[56] References Cited

U.S. PATENT DOCUMENTS

| | | | |
|---|---|---|---|
| 3,204,584 | 9/1965 | Meadjan | 108/143 |
| 3,960,240 | 6/1976 | Cotton | 182/187 |
| 4,316,526 | 2/1982 | Amacker | 182/187 X |
| 4,417,645 | 11/1983 | Untz | 182/187 X |
| 4,452,338 | 6/1984 | Untz | 182/187 |
| 4,488,620 | 12/1984 | Gibson | 182/135 |
| 4,549,633 | 10/1985 | Merritt | 182/187 X |

Primary Examiner—Reinaldo P. Machado
Assistant Examiner—Alvin Chin-Shue
Attorney, Agent, or Firm—John M. Harrison

[57] ABSTRACT

A tree climbing support which includes as a first element, a body support characterized by a body support frame fitted with an adjustable top yoke which is designed to encircle a tree and adjustably support the body support on the tree. The tree climbing support further includes a foot support having a bottom yoke also adapted to adjustably encircle the tree and support the foot support on the tree below the body support. The tree climbing support is advanced up and down the tree by placing the feet on the foot support, with the body resting on the body support and traversing the tree in inchworm fashion by alternately moving the body support and foot support along the tree trunk. The body support and foot support are constructed and sized to facilitate nesting of the foot support inside the body support for transporting the tree climbing support in backpack fashion, on a motorcycle, or in a small all-terrain vehicle.

4 Claims, 8 Drawing Figures

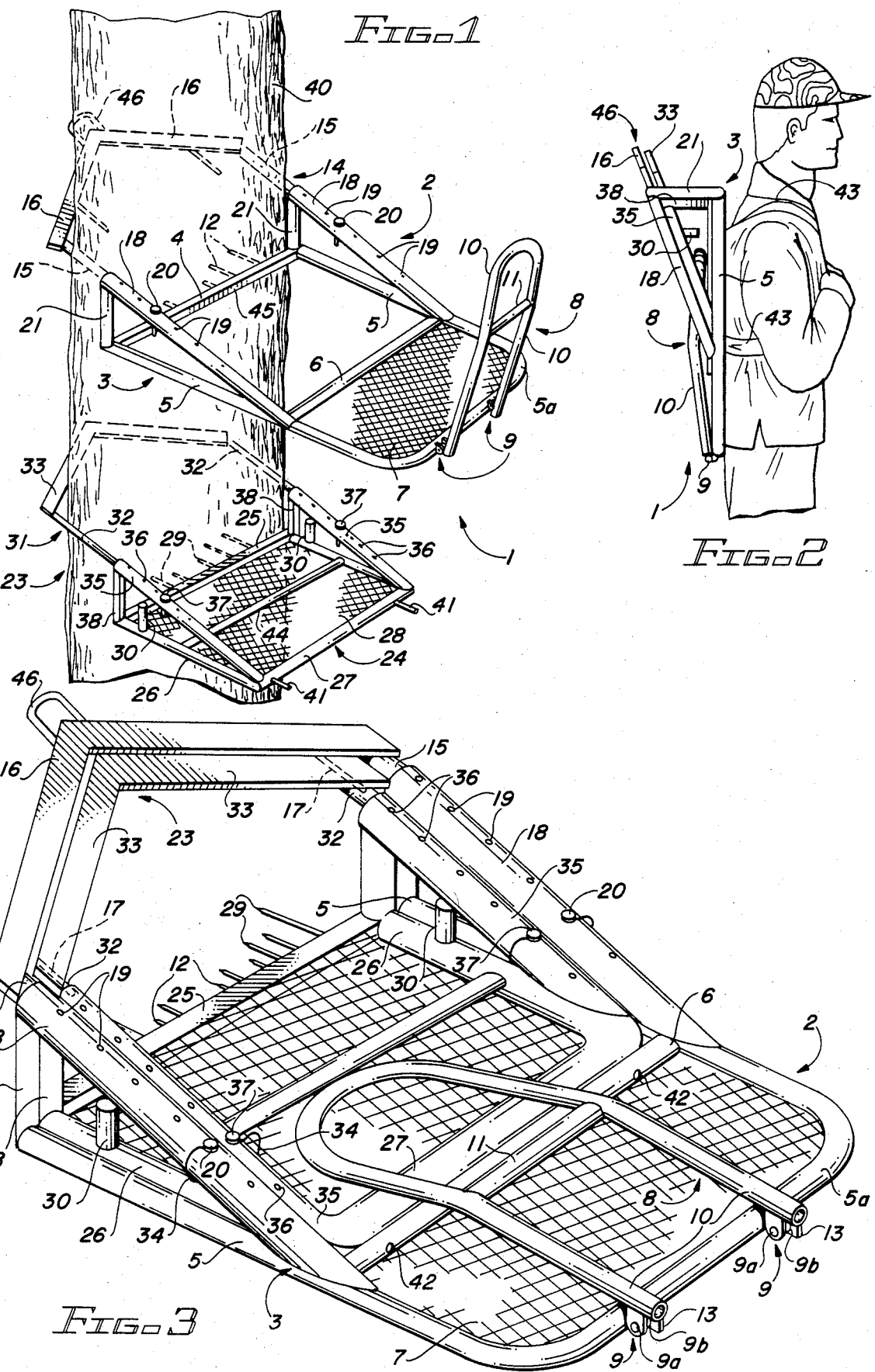

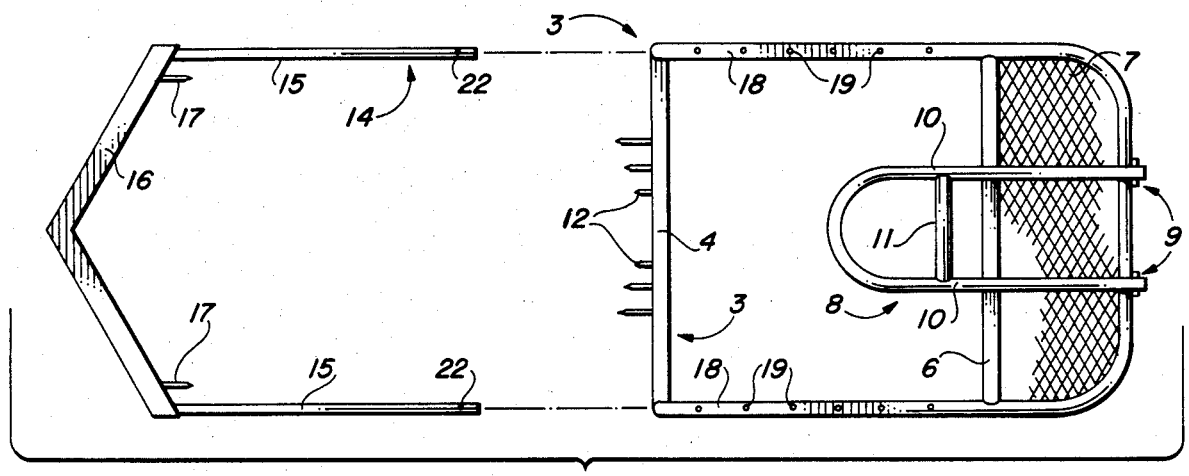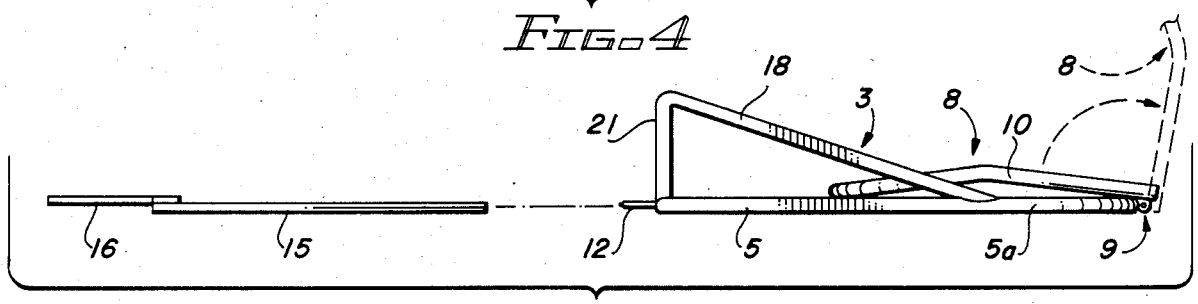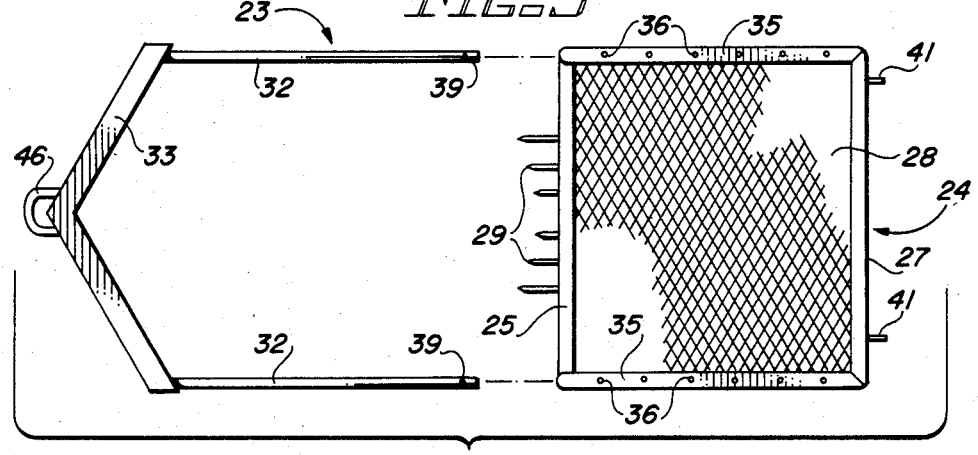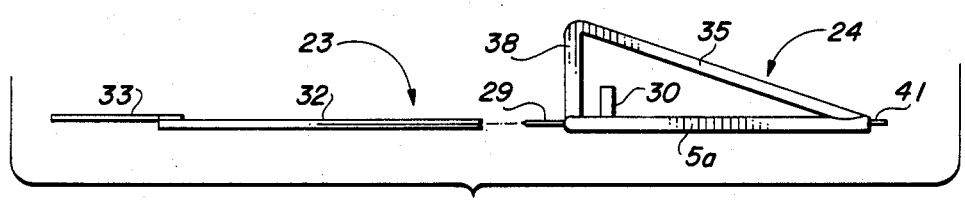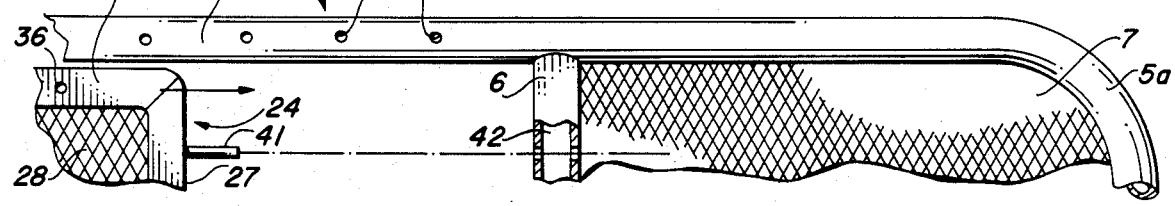

TREE CLIMBING SUPPORT

BACKGROUND OF THE INVENTION

1. Field of the Invention

This invention relates to an apparatus for ascending and descending trees, utility poles and other vertically oriented structures of limited diameter and more particularly, to a tree climbing support which is characterized by a portable body support and a cooperating foot support. The body support and foot support are both fitted with removable and adjustable yokes which encircle the tree and enable traversal of the tree trunk in inchworm-fashion by a hunter who is alternately supported by the body support and the foot support. In a preferred embodiment of the invention the body support is provided with a folding backrest for additional comfort during hunting. Both the body support and the foot support of this invention are light in weight, easy to manipulate and are designed to nest together for ease in transportation on a motorcycle or in a three or four-wheel all-terrain vehicle or in backpack fashion.

2. Description of the Prior Art

Various tree and pole climbing apparatus, including climbing deerstands and gun platforms in particular, are known in the art. Typical of these platforms is the apparatus known as "The Rifleman", which is advertised in "Bow and Arrow" magazine in a feature known as "The Bow Hunter's Annual" on June 9, 1977, at page 66. This apparatus utilizes a climbing means and a cooperating foot support which appear to be light in weight and fairly easy to manipulate. Also typical of climbing apparatus known in the art, is the hand climber for use with a tree climbing platform, as disclosed in U.S. Pat. No. 4,168,765, to Clarence E. Ferguson, et al. This climbing apparatus includes a hand climber which is attached to a tree or pole at a point above the user and is used in cooperation with a support platform carried by the users feet, with the user pulling himself and the support platform up the tree or pole, or grasping the hand climber and subsequently supporting himself on the support platform while manipulating the hand climber higher up the tree or pole. A similar pole-climbing apparatus is disclosed in U.S. Pat. No. 4,137,995, to Frank Fonte, which apparatus includes a pair of platforms, one of which support the feet of a user and the other positioned about the waist of the user, both of which platforms engage the tree or pole to be climbed. The upper platform is initially used to support the weight of the user and the lower platform is pulled upwardly while the users weight is supported by the lower platform, to facilitate a means for moving up and down the pole or tree. Yet another climbing apparatus or hunting stand is disclosed in U.S. Pat. No. 3,944,022, to Joseph W. Ming. The Ming tree climbing stand is built of rigid sheet material and includes a pair of tubular runners secured to either side of the stand and having a tree-connecting end fitted with a V-notch in the center. As in the case of the Ferguson stand, this climbing platform is provided with a means for inserting the feet and climbing is accomplished by grasping the tree, pulling the platform upwardly with the legs and subsequently using the platform to support the legs while the user facilitates another grip higher on the tree. Descent is accomplished by reversing this climbing procedure. Yet another climbing platform is detailed in U.S. Pat. No. 3,338,332, to H. W. Brantly. The deer stand of this invention includes a U-shaped bracing element constructed in such a manner as to have a concave inner surface rest against the front of a tree; a clamping bar which can be connected to the legs of the U-shaped bracing element at the rear of the tree; a platform supported by the U-shaped bracing element and clamping bar; and braces extending downwardly at an angle from the platform, which braces engage the trunk of the tree at a point below the U-shaped bracing element.

Many of the prior art climbing platforms and portable climbing stands in particular, suffer from the disability of being relatively complicated and sometimes heavy, which are severe disadvantages to any hunter who must depend on mobility by foot in order to insure access to the areas frequented by wild game such as deer. Furthermore, some of the prior art devices, while light in weight, are not structurally sound, nor are they sufficiently large for safe relative positioning of the hunter and many do not include those basic safety features which are necessary to protect the hunter. Another disadvantage of the two-component climbing devices which include a foot and body support is the difficulty of carrying both elements while the hunter is on foot, riding a motorcycle or driving a three or four-wheel all terrain vehicle.

Accordingly, it is an object of this invention to provide a new and improved tree climbing support which is characterized by a body support and a cooperating, nesting foot support for engaging a tree in spaced relationship and facilitating traversal of the tree trunk in inchworm-fashion by a hunter while the hunter is alternately supported by the body support and the foot support.

Another object of this invention is to provide a new and improved tree climbing support which is designed for transportation in nested relationship and is characterized by a high degree of safety, lightness of weight and maximum comfort when manipulated into the tree-climbing and hunting configuration.

Yet another object of this invention is to provide a new and improved tree climbing support which can be quickly and easily transported in nested, backpack configuration to a desired hunting area and quickly and easily attached to a tree as separate body support and foot support elements for traversing the tree trunk in inchworm-fashion and disposition in hunting configuration at a selected height on the tree trunk.

Yet another object of the invention is to provide a tree climbing support having body support and foot support elements of dissimilar size, which elements are easily transported in nested configuration and are quickly, easily and adjustably fitted to a tree or pole by means of cooperating removable, adjustable yokes to facilitate quick and easy traversal of a tree or pole both upwardly and downwardly, by alternately supporting the body on the body support and foot support.

Still another object of this invention is to provide a tree climbing support which is characterized by a nesting body support and foot support, each having an angular yoke for engagement with a tree or pole, with engaging bars or blades secured to the yokes and positioned against the opposite side of the tree with a desired degree of slack, in order to facilitate traversal of the tree trunk both upwardly and downwardly by a hunter.

A still further object of this invention is to provide a light-weight, easily maneuvered tree climbing support which includes a body support and a cooperating foot support, both of which are characterized by nesting, rectangular-shaped frames and each having an adjustable yoke extending therefrom for engaging a tree trunk or a pole, in order to facilitate traversal of the tree trunk or pole both upwardly and downwardly in inchworm-fashion by alternately placing hunter's weight on the body support and the foot support.

Still another object of this invention is to provide a tree climbing support which is characterized by a body support and a cooperating foot support, which body support and foot support are of dissimilar width and are designed to nest in a compact, easy to manage carrying configuration for transportation by a motorcycle, an all-terrain vehicle or in backpack fashion and to quickly and easily disengage and deploy for engaging a tree or pole in spaced relationship and facilitate both climbing and descending of the tree or pole in inchworm-fashion by reversing body weight to and from the body support and the foot support, respectively.

A still further object of the invention is to provide a tree climbing apparatus which includes a body support and foot support elements which can be quickly and easily interlocked by means of pins and spikes in nested configuration for transportation and deployed for positioning on a tree or pole in spaced relationship to climb and descend the tree or pole, which body support and foot support also cooperate to facilitate multiple selected sitting and standing positions in hunting configuration, both facing and facing away from the tree or pole.

SUMMARY OF THE INVENTION

These and other objects of the invention are provided in a tree climbing support which is characterized by a body support and a cooperating, interlocking and nesting foot support, each of which body support and foot support include a removable, adjustable, angled yoke for engaging a tree and supporting a hunter such that the hunter is able to traverse the tree both upwardly and downwardly in inchworm-fashion by alternately placing his weight on the body support and the foot support.

BRIEF DESCRIPTION OF THE DRAWING

The invention will be better understood by reference the accompanying drawings, wherein:

FIG. 1 is a perspective view of the tree climbing support of this invention in functional position on a tree;

FIG. 2 is a side view of the tree climbing apparatus illustrated in FIG. 1, nested in backpack configuration for transportation;

FIG. 3 is a perspective view of the nested tree climbing support illustrated in FIG. 2;

FIG. 4 is a top view of the body support element of the tree climbing support illustrated in FIG. 1;

FIG. 5 is a side view of the body support illustrated in FIG. 4;

FIG. 6 is a top view of the foot support element of the tree climbing support illustrated in FIG. 1;

FIG. 7 is a side view of the foot support illustrated in FIG. 6; and

FIG. 8 is a top sectional view of the body support and foot support, more particularly illustrating a preferred nesting connection between the body support and the foot support.

DESCRIPTION OF THE PREFERRED EMBODIMENTS

Referring initially to FIG. 1 of the drawings, in a preferred embodiment the tree climbing support of this invention is generally illustrated by reference numeral 1. The tree climbing support 1 includes a body support 2 which is characterized by a generally rectangular-shaped body support frame 3, provided with a top engaging member 4, which is braced by an engaging member brace 45 and is constructed of square metal stock, for engaging the tree 40. A top support brace 6 is spaced from the top engaging member 4 by a pair of parallel top support legs 5 and the top support legs 5 are shaped to define a curved top support extension 5a. In a preferred embodiment of the invention a backrest 8 is pivotally secured to the extending end of the top support extension 5a by means of two hinges 9, which are attached to the extending ends of the backrest legs 10. A backrest brace 11 spans the backrest legs 10 and the backrest 8 is selectively pivotable into a non-functional or carrying position flat against the top support brace 6 and in upward standing, functional relationship as illustrated in FIG. 1. Seat mesh 7, which is constructed of expanded metal or other desired material, spans a portion of the top support legs 5 and the top support extension 5a to support the hunter when the tree climbing support 1 is deployed on a tree 40. Multiple top spikes 12 extend from the top engaging member 4, in order to engage and penetrate the tree 40 when the body support 2 of the tree climbing support 1 is functionally oriented in climbing configuration, as illustrated in FIG. 1. A pair of tubular top yoke sleeves 18 are welded or otherwise secured at one end to the top support legs 5 and are supported in fixed, angular relationship with respect to the top support leg 5 by a pair of top yoke sleeve braces 21, as illustrated. A pair of round top yoke legs 15 are adjustably inserted in slidable relationship inside the tubular top yoke sleeves 18, respectively, and are secured in this position by the top pins 20, which insert through top sleeve adjusting holes 19, provided in the top yoke sleeves 18, and registering top yoke apertures 22, located in the top yoke legs 15, as illustrated in FIG. 4, in order to support the body support 2 on the tree 40. This support is facilitated by a generally V-shaped top yoke blade 16, which is provided with a pair of top yoke blades spikes 17 that extend rearwardly toward the top spikes 12 and are designed to register with the ends of the bottom yoke legs 32 when the tree climbing support 1 is oriented in carrying configuration, as herein after described. It will be appreciated by those skilled in the art that the top yoke 14 can be adjusted in telescopic relationship with respect to the top yoke sleeves 18, in order to accommodate a tree 40 of any diameter which does not exceed the distance between the top yoke legs 15.

Referring again to FIG. 1 of the drawings, a foot support 23 is also illustrated in functional configuration mounted on the tree 40 beneath the body support 2. The foot support 23 is characterized by a generally rectangular-shaped foot support frame 24, provided with a bottom engaging member 25, constructed of square metal stock, and an end frame member 27 which is spaced from the bottom engaging member 25, by a pair of parallel side frame members 26, as illustrated. A foot rest mesh 28 of expanded metal or other desired material spans the foot support frame 24 and is supported by a frame brace 44 which spans the side frame members 26, in order to support the feet for operating the tree climbing support 1, as hereinafter described. Multiple bottom spikes 29 project forwardly from the bottom engaging member 25, in order to penetrate the tree 40 and help stabilize the foot support 23 on the tree 40 beneath the body support 2, in climbing or descending configuration. A pair of tubular bottom yoke sleeves 35 are welded at one end to the end frame member 27 and extend forwardly toward the tree 40 in fixed, angular relationship with respect to the side frame members 26. The extending ends of the bottom yoke sleeves 35 are welded or otherwise attached to the parallel bottom yoke sleeve braces 38, respectively, as illustrated. A pair of upward standing foot pegs 30 are also welded or otherwise attached in parallel spaced relationship to the side frame members 26, in order to prevent the feet of a user from extending forwardly in contact with the tree 40 when the tree climbing support 1 is in use, as hereinafter described. A bottom yoke 31 is designed for engagement with the foot support frame 24, such that the extending ends of the round, parallel bottom yoke legs 32 telescope inside the tubular bottom yoke sleeves 35, respectively. The bottom yoke legs 32 are adjustably secured in the bottom yoke sleeves 35 by a pair of bottom pins 37, which extend through registering bottom sleeve adjusting holes 36 located in the bottom yoke sleeves 35 and bottom yoke apertures 39, provided in the bottom yoke legs 32, as illustrated in FIG. 6 of the drawings. As in the case of the top yoke 14, the bottom yoke 31 is fitted with a generally V-shaped bottom yoke blade 33, which spans the opposite ends of the bottom yoke legs 32 and is welded or otherwise attached thereto. The inside edges of both the bottom yoke blade 33 and the top yoke blade 16 can be sharpened, in order to better engage the tree 40 and support the foot support 23 and the body support 2 on the tree 40 in spaced relationship, as illustrated in FIG. 1.

Referring now to FIGS. 2, 3 and 8 of the drawings the body support 2 of the tree climbing support 1 is slightly wider than the foot support 23, such that the foot support 23 can be inserted or nested and interlocked inside the body support 2, as illustrated in FIGS. 2 and 3. Accordingly, when oriented in such a nested configuration, the tree climbing support 1 can be fitted with shoulder straps 43 and carried in backpack fashion, as illustrated in FIG. 2. Alternatively, the tree climbing support 1 can be strapped to a motorcycle or an all-terrain vehicle and transported to the hunting location as a compact, easily handled entity. Referring to FIGS. 1, 3 and 8, this nesting relationship is effected in part by a pair of pins 41 which project in spaced relationship from the end frame member 27 of the foot support 23 and are designed to register with corresponding pin openings 42, located in the top support brace 6 of the body support 2. Accordingly, when the foot support 23 is to be nested in the body support 2, the pins 41 are initially aligned with the pin openings 42, respectively, and the foot support 23 is nested and interlocked in position inside the body support 2, as illustrated in FIGS. 2 and 3. This interlocking relationship is further aided by introduction of the top yoke blade spikes 17 inside the ends of the bottom yoke legs 32, as illustrated in FIG. 3. Accordingly, when the foot support 23 is located in the proper nested position with respect to the body support 2, the bottom yoke blade 33 of the bottom yoke 31 rests on the top yoke blades spikes 17, as illustrated in FIG. 3. This contact between the bottom yoke blade 33 and the top yoke blades spikes 17, coupled with the insertion of the pins 41 in the pin openings 42, stabilizes the foot support 23 in nested relationship with respect to the body support 2 and enables the tree climbing support 1 to be easily handled and transported by vehicle or fitted with the shoulder straps 43 and carried in backpack fashion, as heretofore described and as illustrated in FIG. 2.

Referring again to FIG. 1 of the drawings, the tree climbing support 1 is used to ascend a tree 40 by initially mounting the body support 2 and the foot support 23 to the tree 40 in the relative positions illustrated. This mounting is accomplished by first detaching the top yoke 14 from the body support frame 3 by removing the top pins 20 and subsequently spanning the tree 40 with the top yoke legs 15. The top yoke legs 15 are then again telescopically inserted in the top yoke sleeves 18 and the top pins 20 are reinserted in registering ones of the top sleeve adjusting holes 19 and top yoke apertures 22, to secure the body support 2 firmly on the tree 40. Similarly, the foot support 23 is mounted on the tree 40 beneath the body support 2 by removing the bottom yoke 31 from the foot support frame 24, spanning the tree 40 with the parallel bottom yoke legs 32 and reinserting the bottom yoke legs 32 in the bottom yoke sleeves 35, with the bottom pins 37 located in registering bottom sleeve adjusting holes 36 and bottom yoke apertures 39, respectively. The tree climbing support 1 is then used to ascend the tree 40 by initially supporting the upper portion of the body on the body support 2 and inserting the feet between the respective bottom yoke sleeves 35 and side frame members 26, rearwardly of the foot pegs 30. Pressure is then brought to bear on the foot support 23 by extending the legs, simultaneously lifting the body support 2 and sliding the body support 2 upwardly on the tree 40. When this maneuver is accomplished, the body weight is again shifted to the body support 2 and the legs are drawn upwardly toward the chest, bringing the foot support 23 closer to the body support 2. This procedure is repeated such that the tree 40 is traversed in inchworm-fashion until a desired height is reached, at which point the foot support 23 is shifted around the tree 40 out of alignment with the body support 2, body weight is placed on the foot support 23, the top pins 20 are individually removed and the top yoke 14 is adjusted with respect to the top yoke sleeves 18, to substantially align the body support frame 3 on the tree 40 in horizontal relationship. The top pins 20 are then reinserted in registering ones of the top sleeve adjusting holes 19 and the top yoke apertures 22, to insure that the body support frame 23 is maintained in a substantially horizontal relationship while supporting the weight of the hunter. The hunter then positions himself on the seat mesh 7 of the body support frame 3 and rotates the backrest 8 outwardly, if desired, in order to provide a functional and comfortable platform and support for hunting purposes. While the hunter is thus supported, the foot support 23 is maintained in the relative position illustrated in FIG. 1, either beneath or offset from the body support 2 by its own weight and is ready for use in descending the tree 40 as desired. When it is desired to descend the tree 40, the hunter initially shifts his body weight from the body support frame 3 to the foot support 23, while again locating his feet in the space between the bottom yoke sleeves 35 and the side frame members 26 rearwardly of the foot pegs 30. The backrest 8 is then folded against the top support brace 6, as illustrated in FIG. 3. The body weight is then again shifted to the legs and feet and the body support 2 is lowered with respect to the foot support 23, after which, the body weight is shifted to the body support 2 and the foot support 23 is moved downwardly farther away from the body support 2. The tree 40 is traversed in descending fashion by repeating this inchworm pattern until ground level is reached.

Referring again to FIGS. 2, 3 and 8 of the drawings, when it is desired to secure the tree climbing support 1 into carrying configuration, the smaller foot support 23 is initially placed inside the larger body support 2, as illustrated in FIGS. 3 and 8. The pins 41 are then aligned with and inserted in the pin openings 42 located in the top support brace 6 of the body support 2 and the top yoke blade spikes 17 are inserted in the ends 8 of the top yoke legs 15, as heretofore described. The bottom yoke blade 33 then rests against the top yoke blade spikes 17 and shoulder straps 43 are attached to appropriate brackets (not illustrated), according to the knowledge of those skilled in the art, if the tree climbing support 1 is to be supported on the back and shoulders as illustrated in FIG. 2, for backpacking.

Referring again to FIG. 3 of the drawings, in a most preferred embodiment of the invention the hinges 9, which are designed for pivotally supporting the back rest 8 on the top support extension 5a, are each characterized by a hinge pin 9a which extends through a corresponding hinge pin bracket 9b, secured to each respective back rest leg 10. The hinge pin 9a also projects through a cleat (not illustrated) which is welded or otherwise secured to the top support extension 5a. A hinge stop 13 is welded or otherwise secured to the extending end of each of the back rest legs 10, in order to facilitate secure orientation of the back rest 8 in the configuration illustrated in FIG. 1. In another most preferred embodiment of the invention each of the top pins 20 and bottom pins 37 are provided with pin keepers 34, as further illustrated in FIG. 3, in order to prevent loss of the top pins 20 and bottom pins 37, during transportation of the tree climbing support 1.

A primary feature of the tree climbing support 1 of this invention is convenience and easy applicability to trees having a wide variety of diameters, as well as lightness of weight and easy transportability on an all-terrain vehicle, motorcycle or in backpack fashion. The ring 46 serves to help separate the body support 2 from the foot support 23 when the body support 2 is nested in the foot support 23. Weight characteristics are particularly important, under circumstances where the hunter must traverse a substantial area on foot in order to reach an ideal hunting location. Furthermore, the tree climbing support 1 of this invention is easily constructed and is simple and compact in design, features which are particularly important in hunting, since the tree climbing support is not easily observed while located in functional configuration in a tree.

It is understood that both the body support 2 and the foot support 23 of the tree climbing support 1 can be manufactured of such metals as steel and aluminum, as well as alloy metals known to those skilled in the art, with aluminum being a preferred material of construction due to lightness of weight. Furthermore, the respective component parts of both the body support 2 and the foot support 23 can be bolted together; however, a preferred means of joining the structural elements is by welding.

While the preferred embodiments of the invention have been described above, it will be recognized and understood that various modifications may be made therein and the appended claims are intended to cover all such modifications which may fall within the spirit and scope of the invention.

Having described my invention with the particularity set forth above, what is claimed is:

1. A tree climbing support for ascending and descending a tree comprising:
   (a) a body support characterized by a generally rectangular-shaped body support frame; a pair of substantially parallel top yoke sleeves having one end fixedly secured to opposite sides of said body support frame, respectively, said top yoke sleeves projecting from said body support frame in angular relationship and spaced at a first width with respect to each other; a pair of top yoke adapt to span the tree, with one end of said top yoke legs engaging said top yoke sleeves in telescoping relationship; and a generally V-shaped top yoke blade spanning the opposite ends of said top yoke legs in fixed relationship, whereby said top yoke blade engages one side of the tree and said body support frame engages the opposite side of the tree for supporting said body support on the tree;
   (b) a foot support characterized by a generally rectangular-shaped foot support frame; a pair of substantially parallel bottom yoke sleeves having one end fixedly secured to opposite sides of said foot support frame, respectively, said bottom yoke sleeves projecting from said foot support frame in angular relationship and spaced at a second width which is smaller than said first width, whereby said foot support can be nested inside said body support; a pair of bottom yoke legs adapted to span the tree, with one end of said bottom yoke legs engaging said bottom yoke sleeves in telescoping relationship; and a generally V-shaped bottom yoke blade spanning the opposite ends of said bottom yoke legs in fixed relationship, whereby said bottom yoke blade engages one side of the tree and said foot support frame engages the opposite side of the tree for supporting said foot support on the tree beneath said body support; and
   (c) an end frame member provided in said foot support frame; a pair of pins projecting in spaced, substantially parallel relationship from said end frame member; a top support brace provided in said top support; and a pair of pin openings located in said top support brace, whereby said end frame member is positioned adjacent said top support brace and said pins are inserted in said pin openings when said foot support is nested in said body support, and a pair of top yoke blade spikes projecting from said top yoke blade for registration with said bottom yoke legs when said foot support is nested in said body support.

2. The tree climbing support of claim 1 further comprising a backrest pivotally carried by said body support for supporting the back of a hunter seated on said body support.

3. The tree climbing apparatus of claim 1 further comprising:
   (a) a plurality of top sleeve apertures provided in spaced, transverse relationship in said top yoke sleeves, respectively; at least one top yoke leg aperture provided in spaced, transverse relationship in each of said top yoke legs, respectively; and a pair of top pins extending through registering ones of said top sleeve apertures and said top yoke leg aperture for securing said top yoke legs to said top yoke sleeves in adjustable relationship, respectively; and (b) a plurality of bottom sleeve apertures provided in spaced, transverse relationship in each of said bottom yoke sleeves, respectively; at least one bottom yoke leg aperture provided in spaced, transverse relationship in said bottom yoke legs, respectively; and a pair of bottom pins extending through registering ones of said bottom sleeve apertures and said bottom yoke leg aperture for securing said bottom yoke legs to said bottom yoke sleeves in adjustable relationship, respectively.

4. The tree climbing apparatus of claim 1 further comprising a pair of foot pegs carried by said foot support frame in spaced relationship for positioning a foot on each side of said foot support frame and lifting said foot support.

* * * * *